Aug. 29, 1939.   T. W. PATERSON   2,170,930
TRANSMISSION APPARATUS
Filed June 15, 1936   2 Sheets-Sheet 1
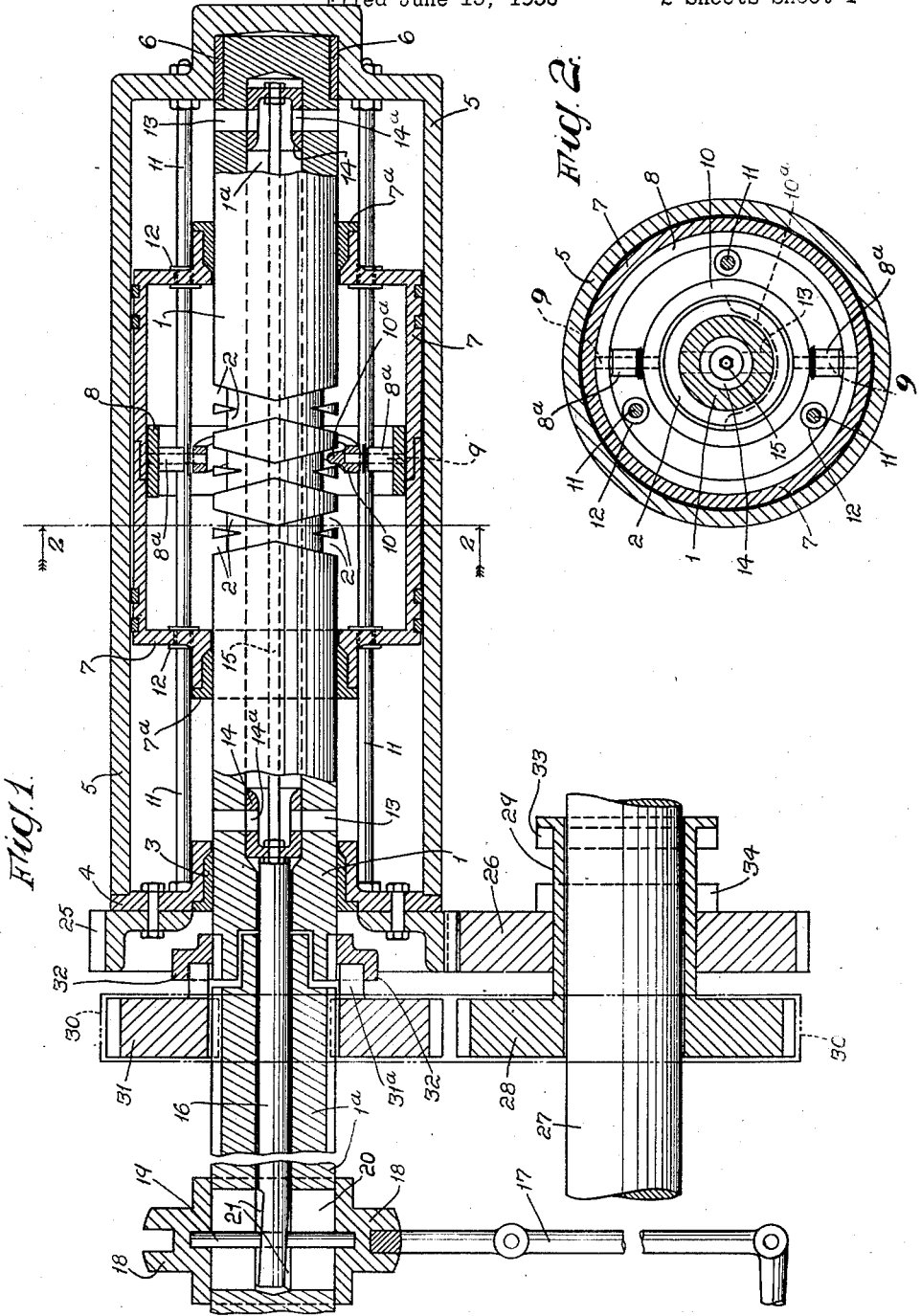
WITNESSES
A Swift
G. N. Forster
INVENTOR
T. Watson Paterson Aug. 29, 1939.    T. W. PATERSON    2,170,930
TRANSMISSION APPARATUS
Filed June 15, 1936    2 Sheets-Sheet 2
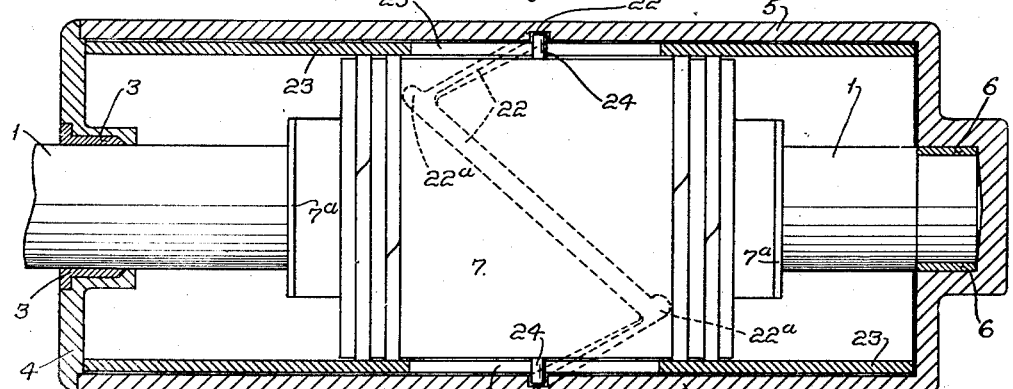
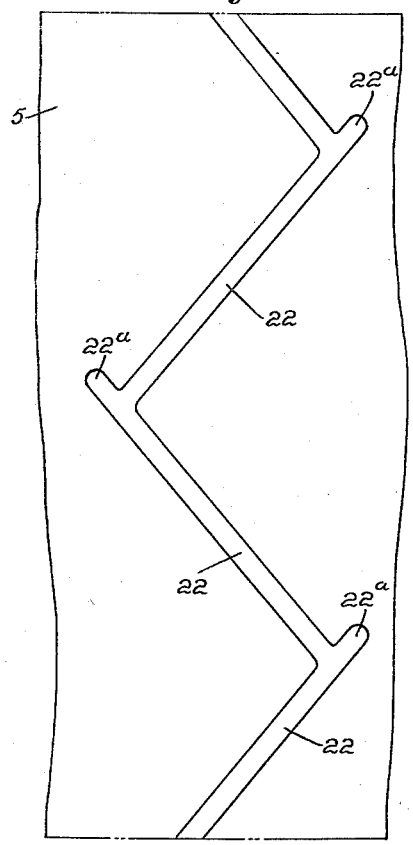
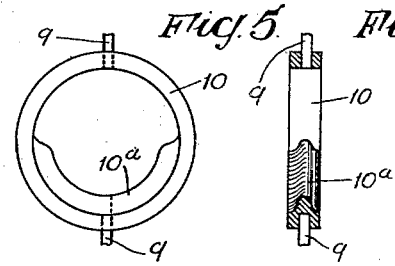
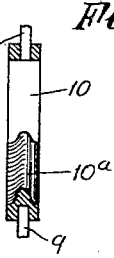
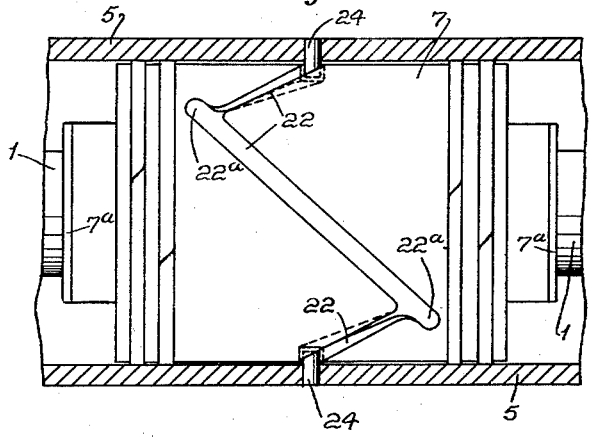
WITNESSES.
A. Swift
J. N. Foister
INVENTOR.
T. Watson Paterson Patented Aug. 29, 1939

2,170,930

UNITED STATES PATENT OFFICE 2,170,930

TRANSMISSION APPARATUS

Thomas Watson Paterson, Aigburth, Liverpool, England

Application June 15, 1936, Serial No. 85,190
In Great Britain June 22, 1935

4 Claims. (Cl. 192—59)

This invention relates to a new method of mechanically and/or hydraulically transmitting power in a manner infinitely variable, and provides apparatus so designed, arranged or constructed, that while it is capable of performing in a manner characteristic of known types of hydraulic transmission apparatus, my invention differs in that it provides novel means for relieving the direct load imposed upon the hydraulic element.

It is well known that hydraulic transmission apparatus as hitherto constructed suffers seriously from lack of efficiency when the liquid medium employed is depleted, even to a small extent, as any such depletion permits gaseous matter to take the place of the liquid, and as the former is compressible the undesirable resilience is such that lack of efficiency results. Such being the case, it will be readily appreciated that in order to maintain maximum efficiency in any self-contained hydraulic power transmitting apparatus, it is essential that no loss of the liquid medium employed shall be permitted, as the lack of success, particularly in the case of motor road vehicles fitted with hydraulic power transmission, is traceable to the escape of liquid, with resultant loss of efficiency in the transmission of power from the engine to the final drive. Unsuccessful efforts have been made to obviate this defect by various forms of sealing glands, and by the use of reduction gears additional to the hydraulic element, in order to relieve the pressure due to load as and when conditions arise causing such pressure.

Under this invention, the hydraulic element is capable of performing under a heavy load, as though it had a gear box with reduction gear wheels to assist it, but in this case no gear wheels are employed.

The reduction of resistance on the part of the hydraulic element in combination with its driving element is so arranged that the mutual functioning relieves the pressure within the hydraulic element, thereby relieving working pressure on gland packing or other sealing methods, so that the probability of leakage is remote in view of the fact that the pressure within the hydraulic element is mechanically automatically balanced by virtue of the method in which it is driven, resisted, and counter-balanced by reaction.

Apparatus for the transmission of power according to my invention, is characterised in that a driving shaft, from a prime mover, is provided with co-incident right and left hand screw-threads, adapted, when said shaft is rotated, to reciprocate a hollow piston by means of a nut pivotally anchored within the piston and operatively associated with said screw-threads; and said piston being held against rotary motion within a cylinder in such manner as to not rotate without carrying the latter with it.

Normally, said cylinder or confining casing is adapted to contain liquid to control the speed of reciprocation of said piston by the aid of manually operable valve means which control or regulate the interchange or passage of the liquid via ports connecting both ends of the cylinder.

In a further arrangement of this invention, an operative connection between the cylinder or confining casing and piston is effected by way of helical grooves set at desired pitch in the wall of said outer cylinder and which grooves receive and locate guide pins, or the like, connected with the piston; the arrangement being such that even if no liquid medium be employed in the cylinder there is at all times provided a definite speed ratio between the driving shaft and said outer cylinder, thus effecting a mechanical modification or variation of relative ratios with provision —when said liquid medium is introduced—of hydraulic interception to control and vary such speed ratio at will.

I will further describe my invention with the aid of the accompanying sheets of explanatory drawings which illustrate, by way of examples only, two modes of carrying the same into effect.

In said drawings:

Fig. 1 is a longitudinal section of an apparatus for the hydraulic transmission of power, constructed in accordance with the invention and embodying a plain cylinder or confining casing.

Fig. 2 is a transverse section taken as on line 2—2, Fig. 1.

Fig. 3 is a longitudinal section of a modified arrangement under this invention, but incorporating a helically grooved cylinder or outer casing.

Fig. 4 is a development of the grooved cylinder portion shown in Fig. 3.

Fig. 5 is a front elevation, and Fig. 6 a transverse sectional elevation, illustrating in detail the pivotally anchored nut or collar incorporated in both arrangements.

Fig. 7 is a longitudinal section of a further modified arrangement in which the piston is provided with helical grooves.

In several views like characters of reference denote like or equivalent parts wherever they occur.

Referring to the drawings and first with more particular reference to Figs. 1 and 2 and Figs. 5 and 6 thereof, 1 indicates a driving shaft from the prime mover or power producer and which has a portion provided with co-incident right and left hand screw-threads or grooves 2.

Said driving shaft 1 passes through a gland box 3 provided in an end cap 4 bolted to a cylinder or confining casing 5 which is closed at its opposite end and formed with a bearing 6 for the reception of a reduced or spigot end of driving shaft 1.

Situated within said cylinder or confining casing 5 is a piston 7 having gland boxes 7ª at each end thereof and which encompass and are adapted to reciprocate over the plain or non-screwthreaded portions of driving shaft 1 during the movements of the piston.

Centrally disposed within piston 7—which is constructed in two halves suitably secured together—is fixed a ring or collar 8 provided with diametrically opposite bearings 8ª which pivotally or hingedly anchor similarly disposed spindles 9 secured to and extending from a collar or nut 10 having a semi-circular projection 10ª engaging within the screw-threads 2 of driving shaft 1 in such manner that if rotary motion be imparted to the driving shaft 1, then the mechanical tendency of the nut or collar 10, 10ª engaging in the screw-threads 2 of said shaft will be to reciprocate and carry with it piston 7 if arranged for this purpose, or to rotate with said screw-threaded driving shaft 1, if otherwise so arranged. The configuration at each end of the screw-threads 2 is such that when the nut or collar 10, 10ª reaches the end of a traverse in one direction it is rocked at the correct angle to divert it and ensure smooth return of the piston 7 in its reciprocatory movement.

In the construction illustrated and as a means to prevent the piston 7 from rotating within its cylinder 5 under certain conditions, radially spaced and parallel guide rods 11 slidably pass through correspondingly spaced and aligned bushes 12 provided in the opposite closed ends of piston 7, said guide rods 11 being bolted or otherwise secured to the respective ends of cylinder 5; the arrangement being such that said piston 7 may not rotate without carrying the cylinder 5 with it, but within said cylinder the piston 7 may operate, that is, move longitudinally and rotate gradually, revolving cylinder 5 with it in the process of moving longitudinally, in accordance with the conditions imposed: for example, if the cylinder 5 confining piston 7 be rigidly attached to a resistor or loaded vehicle, and the prime mover or driving shaft 1 be set in motion, the piston 7 will reciprocate within its confining cylinder without imparting rotary motion to said cylinder 5.

As a means to control or retard the reciprocation of piston 7, the confining casing or cylinder 5 is filled to its maximum capacity with suitable liquid, such as oil, which serves as a hydraulic transmitter, whilst piston 7 may also be filled with such liquid in order to assist in preventing oil entering same from the cylinder 5.

Each end of the cylinder 5 communicates by way of ports 13 formed radially in the driving shaft 1 with a hollow interior or central passage 1ª of said shaft, and disposed within said shaft passage 1ª adjacent to each series of ports 13 are tubular valves 14 connected together by a rod 15 disposed within shaft bore 1ª, each valve 14 being provided with correspondingly spaced ports 14ª adapted to be moved into and out of register with said shaft ports 13.

Said valves 14 are connected by an operating spindle 16 and are actuated through the medium of a pivotal fork or drag link 17 connected to an axially slidable collar 18 carrying a fixed pin or projection 19 which passes through a longitudinal slot 20 of prime mover shaft 1ª and an inclined slot 21 in the valve spindle 16; the arrangement being such that when collar 18 with pin 19 is slid along shaft 1, the valve spindle 16 and so the valves 14 are partially rotated in such manner as to place both ends of the cylinder 5 in communication with each other, or isolate same from each other, as the case may be.

When the valves 14 are in open position relative to the shaft ports 13, the oil contained in the cylinder 5 is permitted to freely circulate in and out of the ports 13 to allow interchange or transference of the liquid from both ends of cylinder 5 through the respective valves and by way of the central passage 1ª of driving shaft 1 consequent on the free reciprocation of the piston 7 caused by the operative engagement of the pivotal nut 10, 10ª with the driving shaft 1 as and when the latter is rotating.

Now, if restriction be imposed to the free passage of oil from each end of the cylinder 5 by partial closure of valves 14, retardation of the reciprocal function of the piston 7 is produced, and as the piston is slidable on the guide rods 11 secured to cylinder 5, such retardation imparts corresponding rotational movement to said cylinder.

Such gradual operation of the valves 14 controls the ratio of speed between the driving shaft 1 and cylinder 5—which as previously stated may be rigidly coupled to a resistor or loaded vehicle—until there is finally reached a state where total obstruction to oil transference from both ends of the cylinder 5 is established, and at this stage positive connection or direct drive between driving shaft 1 and cylinder 5 is reached, consequent on the piston 7 being prevented from reciprocal travel.

In this manner, by a small regulation of said valves 14, the available area of the shaft ports 13 may be minutely varied at will and as each minute variation in the available area of said ports causes a slight difference of speed between driving shaft 1 and cylinder 5 any desired speed ratios—ranging from free movement of the driving shaft 1 relative to the driven element or cylinder 5 to positive or direct coupling of these elements—may be attained according to increase or decrease in the size of said ports 13.

It will however, be realised that if the speed of rotation of the power producing element when coupled to the driving shaft 1 is capable of variation, as in the case of an internal combustion engine of a motor vehicle, an infinitely variable speed ratio within any predetermined range may be obtained by appropriate setting of the valves 14.

A motor road vehicle, for example, would require an infinite variation down to the point where it could actually stand still with engine running and the load of the car imposed, but in the case of an aeroplane the propeller may rotate in the atmosphere at an idling speed without importing propulsive effort within the limits as arranged and desired between engine and propeller for any particular circumstance foreseen.

In the arrangement illustrated in Fig. 3, the outer cylinder 5 is provided with helical grooves 22, and a sleeve or liner 23 is intimately and revolubly fitted within said cylinder to prevent excessive transference of liquid medium by leakage via the grooves 22; such sleeve or liner 23 encompasses the piston 7 which is constructed and reciprocated as previously described with reference to Figs. 1 and 2, as it will be understood that the screw-threads 2 of driving shaft 1 together with the nut 10, 10ª of piston 7 have been omitted from the illustration for clarity only.

Piston 7 is provided with diametrically opposed thrust or guide pins 24 which pass through longitudinal slots 23ª formed in said sleeve or liner 23 so as to enter and operatively engage in the helical grooves 22 of cylinder 5 and operatively connect the piston 7 with said cylinder 5 in lieu of the guide rods 11 as in the previously described construction so that even if no liquid medium be employed in the cylinder there is provided a definite mechanical speed ratio between the driving shaft 1 and cylinder 5, such ratio being determined by the pitch or angle of such grooves 22 relative to the pitch of the screw-threads 2 of driving shaft 1 and also by the variation of speed of the driving shaft 1.

In order to ensure one-way movement of the guide pins 24 of piston 7 in and around said helical grooves 22, during reciprocation of the piston by the screw-threads 2 as before described, each groove is extended somewhat at the points 22ª past the point or peak of its connection with the opposite groove so that the guide pins 24 are guided or diverted into the next groove and so on, see more particularly the development illustrated in Fig. 4.

From the foregoing it will be evident that in the case of the apparatus being fitted with an outer cylinder 5 provided with helical grooves a true torque converter is obtained, plus the advantages of an infinitely variable transmission due to the hydraulic interception.

In some cases provision is made for a reversing gear to be incorporated as part of the apparatus, and in one particular arrangement, and as fitted to the apparatus illustrated in Fig. 1, a toothed ring 25 formed on or bolted to the end of cylinder 5 engages in constant mesh a complementary toothed wheel 26 mounted upon a countershaft 27 suitably supported, and which shaft 27 also slidably carries another toothed wheel 28 having a sleeve or collar extension 29 which passes through said toothed wheel 26. Said slidably disposed toothed wheel 28 is meshed preferably by means of a chain 30 with another toothed wheel 31 splined upon the prime mover shaft 1ª and bearing at its front end a component 31ª of a dog clutch 32 fixed to the adjacent end of driving shaft 1 and adapted to mechanically couple the toothed wheel 31 splined to prime mover shaft 1ª with driving shaft 1 of the apparatus for forward driving.

Said sleeve or collar 29 of the chained wheel 28 slidable on countershaft 27 is equipped with a cooperating member 33 of a dog-clutch 34 provided on toothed wheel 26 meshing with wheel 25 fixed to cylinder 5, so that when the chained wheels 31, 28 are moved in alignment as by means of a suitable bracket and lever, the clutch component 31ª is withdrawn from engagement with dog clutch 32 of driving shaft 1 of the transmitting device, whilst clutch component 33 of collar 29 after passing through a neutral position engages with clutch 34 of the constant mesh wheel 26. Thus right hand motion from the prime mover shaft 1ª would impart left hand motion to the cylinder 5 by way of its toothed ring 25, and so provide reverse movement thereof.

It is to be understood that various alterations or modifications may be made to the apparatus hereinbefore described without departing from the spirit and scope of the invention as defined by the claims; for instance, the arrangement shown in Fig. 3 illustrates the helical grooves 22 formed in the outer cylinder 5 and which grooves 22 are engaged by the thrust or guide pins 24 connected with the piston 7, but in a converse construction—as illustrated in Fig. 7—of this mechanical connection between cylinder 5 and piston 7, said helical grooves 22 are formed in the circumference of piston 7 being situated within the surface between the piston rings fitted at both ends of said piston, whilst the thrust or guide pins 24 are connected with the cylinder 5 so as to engage in the grooves 22 of piston 7 in such manner as to operate substantially as hereinbefore described with reference to Fig. 3 and it will also be understood that —as in the case of Fig. 3—the screw-threads 2 of driving shaft 1 and nut 10, 10ª of piston 7 have been omitted from the illustration for clarity only; in this converse arrangement, however, the sleeve or liner 23 is omitted as the piston rings prevent the oil passing from either end of the piston to the piston grooves 22.

What I cleam as my invention and desire to secure by Letters Patent is:

1. Apparatus for the transmission of power, wherein a driving shaft, from a prime mover, is provided with coincident right and left hand screw-threads, adapted, when said shaft is rotated, to reciprocate a hollow piston by means of a nut pivotally anchored within the piston and operatively associated with said screw-threads; and said piston being held against rotary motion within a cylinder in such manner as to not rotate without carrying the latter with it.

2. Apparatus for the transmission of power as claimed in the preceding claim 1, wherein said cylinder is adapted to contain liquid to control the speed of reciprocation of said piston by the aid of manually operable valve means which control the passage of the liquid via ports connecting both ends of the cylinder, for the purpose specified.

3. Apparatus for the transmission of power as claimed in the preceding claim 1, in which an operative connection between the cylinder and piston is effected by way of helical grooves formed in the walls of said cylinder and which receive and locate guide pins connected with the piston, for the purpose specified.

4. Apparatus for the transmission of power as claimed in the preceding claim 1, in which an operative connection between the cylinder and piston is effected by way of helical grooves formed in the circumference of the piston and which receive and locate guide pins connected with the cylinder, for the same purpose specified.

T. WATSON PATERSON.